US010216558B1

United States Patent
Gaber et al.

(10) Patent No.: US 10,216,558 B1
(45) Date of Patent: Feb. 26, 2019

(54) PREDICTING DRIVE FAILURES (71) Applicant: EMC IP Holding Company LLC, Hopkinton, MA (US)

(72) Inventors: Shiri Gaber, Beer Sheba (IL); Oshry Ben-Harush, Kibutz Galon (IL); Amihai Savir, Sansana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 108 days.

(21) Appl. No.: 15/283,096

(22) Filed: Sep. 30, 2016

(51) Int. Cl.
 G06F 11/34 (2006.01)
 G06F 11/07 (2006.01)
 G06F 11/30 (2006.01)
 G06N 99/00 (2019.01)
 G06N 7/00 (2006.01)

(52) U.S. Cl.
 CPC ...... *G06F 11/0727* (2013.01); *G06F 11/0766* (2013.01); *G06F 11/3034* (2013.01); *G06F 11/3452* (2013.01); *G06N 7/005* (2013.01); *G06N 99/005* (2013.01)

(58) Field of Classification Search
 CPC .......... G06F 11/3447; G06F 11/3452; G06F 11/0727; G06F 11/0766; G06F 11/3034
 See application file for complete search history.

(56) References Cited

U.S. PATENT DOCUMENTS

| 7,136,768 | B1 * | 11/2006 | Shah | G06F 11/008 |
| | | | | 702/115 |
| 9,542,296 | B1 * | 1/2017 | Engers | G06F 11/3452 |
| 2008/0028264 | A1 * | 1/2008 | Kerner | G06F 11/0727 |
| | | | | 714/42 |
| 2014/0019813 | A1 * | 1/2014 | McLean | G06F 17/30575 |
| | | | | 714/47.3 |
| 2014/0146648 | A1 * | 5/2014 | Alber | G11B 27/002 |
| | | | | 369/53.1 |

(Continued)

OTHER PUBLICATIONS

Zhu, Bingpeng, et al., "Proactive Drive Failure Prediction for Large Scale Storage Systems," Proceedings of the IEEE 29th Symposium on Mass Storage Systems and Technologies (MSST), 2013, pp. 1-5, China.

(Continued)

*Primary Examiner* — Yolanda L Wilson
(74) *Attorney, Agent, or Firm* — Womble Bond Dickinson (US) LLP (57) ABSTRACT

Predicting individual drive failures is achieved using machine learning models of drive behavior history based on samples of SMART data attributes collected over distinct time-periods. The drive behavior history is a historical feature added to drive features modeled based on a last sample of SMART data attributes. The drive behavior history feature is used in successive modeling of drive behavior history to increase accuracy in predicting an individual drive's failure over time. Consecutive individual drive failure predictions are aggregated to further increase accuracy in predicting an individual drive's failure. In one embodiment, the system models drive behavior history and other drive features using a machine learning model. Individual drives classified as predicted to fail within a certain period of time are incorporated into a drive replacement strategy that factors in a field-based replacement cost associated with the drive.

18 Claims, 8 Drawing Sheets

(56) References Cited

U.S. PATENT DOCUMENTS

| | | | |
|---|---|---|---|
| 2014/0181363 A1* | 6/2014 | Hoang | G06F 12/0246 |
| | | | 711/103 |
| 2014/0344624 A1* | 11/2014 | Nishikawa | G06F 11/0778 |
| | | | 714/37 |
| 2014/0359376 A1* | 12/2014 | Fahimi | G06F 11/0751 |
| | | | 714/48 |

OTHER PUBLICATIONS

Pinheiro, Eduardo, et al., "Failure Trends in a Large Disk Drive Population," Proceedings of the $5^{th}$ USENIX Conference on File and Storage Technologies, Feb. 2007, pp. 1-13, California.

* cited by examiner

300 – Engineered New Feature examples

Drive Failure Probabilities for 16 drives over 12 days (-1 indicates actual failure)

PREDICTING DRIVE FAILURES

FIELD OF THE INVENTION

Embodiments of the present invention relate generally to storage drive technology. More particularly, embodiments of the invention relate to predicting storage drive failures.

BACKGROUND

The growth in digital information is accelerating. An increasing number of disk drives are required to store that information. Because disk drives are essential for the existence of digital information, disk drive reliability analysis, which is a general term for the monitoring and "learning" process of disk drive prior-to-failure patterns, is a highly explored domain both in academia and in industry.

For example, disk drive manufacturers equip both hard disk drives (HDD) and solid state drives (SSD) with Self-Monitoring, Analysis and Reporting Technology (SMART), an industry standard technology for detecting and reporting indicators of drive reliability. Examples of commonly used indicators, referred to as SMART attributes, include reallocation sectors count, reported uncorrectable errors, power-on hours, read-write errors, and so forth.

SMART attributes' thresholds, which are the attributes' values that should not be exceeded under normal operation, are set individually by manufacturers by means that are often considered a trade secret. Since there are more than one-hundred SMART attributes whose interpretation is not always consistent across vendors, rule-based learning of disk drive failure patterns is quite complicated and cumbersome. The reactive nature of rule-based learning limits the accuracy and timeliness (i.e. how far in advance of an actual failure) of any rule-based failure prediction.

To improve failure prediction, other approaches to using SMART attributes have been developed using statistical and machine learning models, but the results have been mixed. Some machine learning models have succeeded in improving the prediction of failure rates of drives in general, but accurate prediction of failures of individual drives is still elusive. Other challenges, such as reducing the number of false positives, remain to be overcome.

The inability to accurately predict drive failures increases the likelihood of data loss or interruption for customers that rely on digital information. Furthermore, it hampers storage provider's efforts to devise an optimized drive replacement strategy that could reduce costs for both storage providers and customers alike.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

As already noted, rule-based learning is inherently reactive, because the host operating system raises an alert only when a pre-determined threshold exception actually occurs and drive failure is imminent. Thus, the reactive nature of rule-based learning limits the accuracy of the rule-based failure prediction and how far in advance of an actual failure can the prediction be made. Moreover, rule-based systems have to be "taught" to detect certain drive conditions and thresholds, and cannot leverage previous history and extrapolate that history to handle new drive failure patterns that may be happening in the field.

Another limitation of rule-based learning of disk drive failure patterns is the difficulty in taking into account the numerous correlations of multiple SMART attributes that can be part of the failure pattern. Some of the SMART attributes display high correlation in their measured values. For example, SMART feature 241, total Logical Block Addresses (LBA) written, is highly correlated with SMART feature 9, power on hours. Correlation between SMART attributes can affect the accuracy of rule-based learning if it is not taken into account by, for example, extracting the correlation level and incorporating it as a feature for the model. In the case of manually-set thresholds for a large number of attributes (e.g. if 80 SMART metrics are collected) most rule-based models can't handle that amount of attributes and their combinations effectively.

Other challenges preventing the achievement of high accuracy in predicting the drive failures include sparse representation of SMART data or other data indicating the health of a drive, lack of cross-product variety in the data, and limitations in the data set size from which to predict drive failure.

For example, for some disk drives data collection is not done automatically and on a regular basis, but only upon a customers' request. This results in sparse representation of the actual status for all the currently installed drives and limits the accuracy and span of the predictions.

In order to achieve accurate predictions, one must have access to extensive, reliable and up-to-date samples, to build smart models upon, while enriching the business drive data and analytics. Currently, different disk drive products are independently collecting, working and analyzing different facets of the drive data. Standardizing and sharing data and solutions to enhance the power of predictive models becomes impossible and much of the value in the data is lost.

However, standardizing and collecting across multiple products increases data set size, which can introduce other challenges. Analysis in the drive-reliability domain poses a challenge of highly non-balanced datasets, meaning that the prediction class (drives that failed) is much smaller than the remaining class (healthy drives), often with a ratio in the order of ~1-2%. Thus, a good model for predicting drive failure requires a dataset in the order of $10^4$ drives to learn from, which is equivalent to $10^7$ rows of data if samples are collected daily throughout the year. Such magnitudes of data cannot be processed on a single machine and require distributed computation methods. A lack of suitable platform/programming capabilities may force one to settle for partial snapshots of the data, thus "missing out" on the latent potential in the complete dataset.

To address these challenges, embodiments of a system for predicting individual drive failures models drive behavior history based on samples of drive health indicators collected over distinct time-periods. In one embodiment, the drive behavior history is a historical feature added to drive features modeled based on a last sample of drive health indicators. In one embodiment, the drive health indicators are SMART data attributes generated in the drive's SMART monitor. In one embodiment, the drive's historical feature is used in successive modeling of drive behavior history to increase accuracy in predicting an individual drive's failure over time.

In one embodiment consecutive individual drive failure predictions are aggregated to further increase accuracy in predicting an individual drive's failure. In one embodiment, the system models drive behavior history and other drive features using a machine learning model.

In one embodiment, the system for predicting individual drive failures classifies drives based on the model of the drive behavior history and drive features. In one embodiment, drives classified as predicted to fail within a certain period of time are incorporated into a drive replacement strategy. In one embodiment, the drive replacement strategy factors in a field-based replacement cost associated with the drive predicted to fail.

Figure 1:
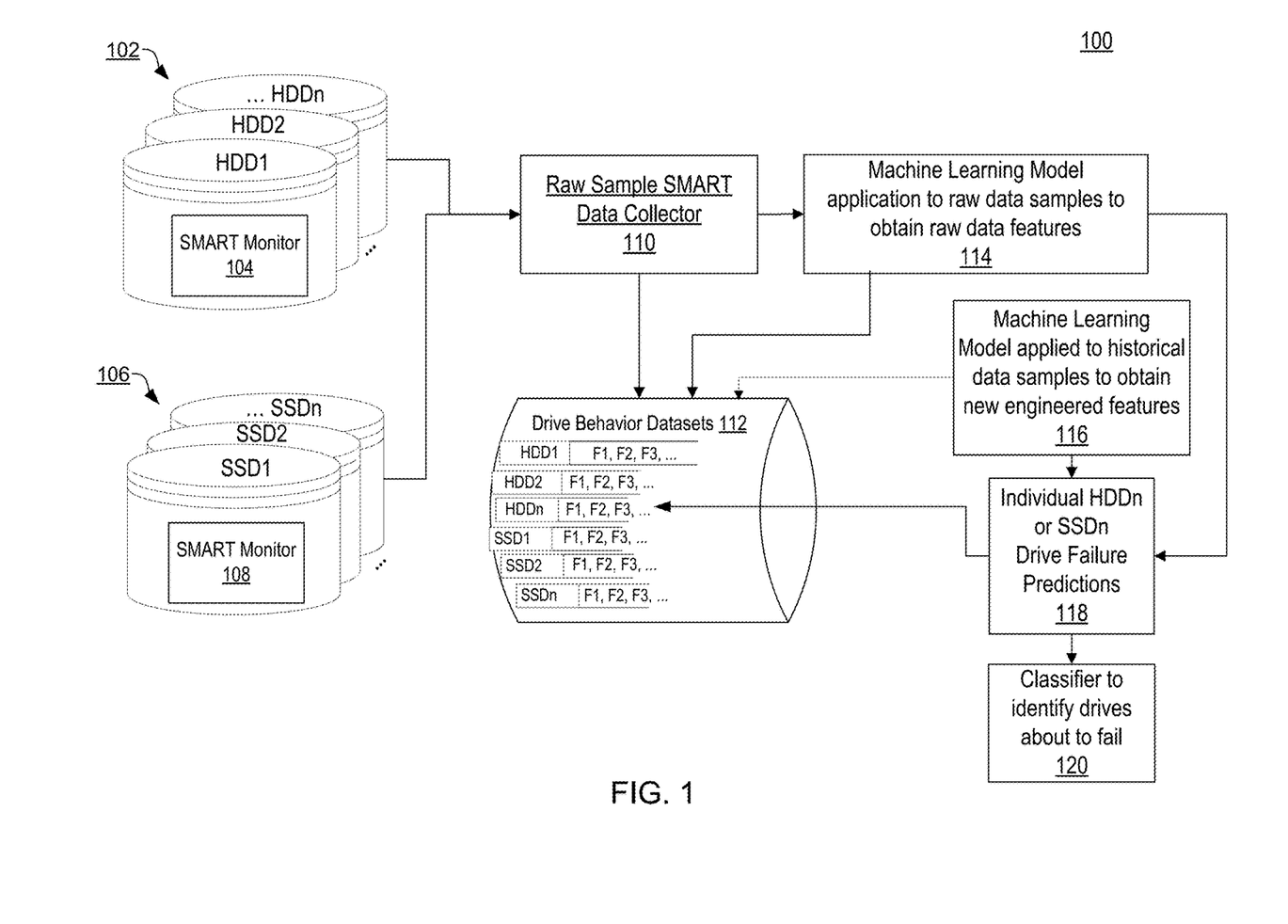
FIG. 1 is a block diagram illustrating an overview of components of a system for predicting drive failures according to one embodiment of the invention.

FIG. 1 is a block diagram illustrating an overview 100 of a system to predict drive failures in which different types of disk drives, such as Hard Disk Drives (HDD) 102 and Solid State Drives (SSD) 106 are equipped with SMART monitors 104/108 to self-monitor and report SMART attributes.

In one embodiment, a raw sample SMART data collector module 110 collects samples of the SMART attributes reported by drives 102/106 and relays them to a first application of a feature selection machine learning model 114. The feature selection machine learning model 114 is applied to the last collected sample of SMART attributes to generate a snapshot of drive features at a single point in time.

In one embodiment, the SMART data collector collects consecutive samples, or historical samples, of SMART attributes over a specific time period, and relays them to a second application of a machine learning model, this time a feature engineering machine learning model 116. The feature engineering machine learning model 116 generates one or more drive behavior history features, also referred to as an engineered, or new feature, that are added to the drive features generated in the first application of the feature selection machine learning model 114.

In one embodiment, the generated drive features and drive behavior history features are stored in a drive behavior datasets repository 112 of features, e.g. F1, F2, F3 accessible by the identification of the drive whose behavior and other features are being modeled. To handle the vast volume of computations that can be performed on the drive behavior datasets stored in the repository and the volume of collected raw SMART data, in one embodiment the raw data table resides in a distributed file system, such as the Hadoop file system. An query layer built on top of the distributed file system, such as the HAWQ SQL layer built on top of Hadoop, is used to run different aggregate functions on historical samples from each drive.

In one embodiment, the application of the machine learning model processes can be performed entirely in the distributed file system. The machine learning modeling pipeline process generates the new statistical engineered features from samples of drive data collected over time so that the features describe the behavior of the drive over time. The new features along with the original features generated from a single sample of SMART data can be stored in drive behavior features datasets. For example, the drive behavior features datasets stored in repository 112 illustrated in FIG. 1 contain one row for each drive, and contain the original features together with the new engineered features. In one embodiment, each drive-specific dataset can be loaded to a single machine running Python for the model-training stage.

In one embodiment, the drive-specific datasets in the drive behavior datasets repository 112 are each used as input to further modeling of the corresponding drives and for input to a classifier 120 of the drives based on individual drive failure predictions 118 made after the application of the feature selection and feature engineering machine learning models 114 and 116. In one embodiment, the classifier 120 classifies the drives 102/106 into those drives that are about to experience drive failures and those that are not.

Figure 2:
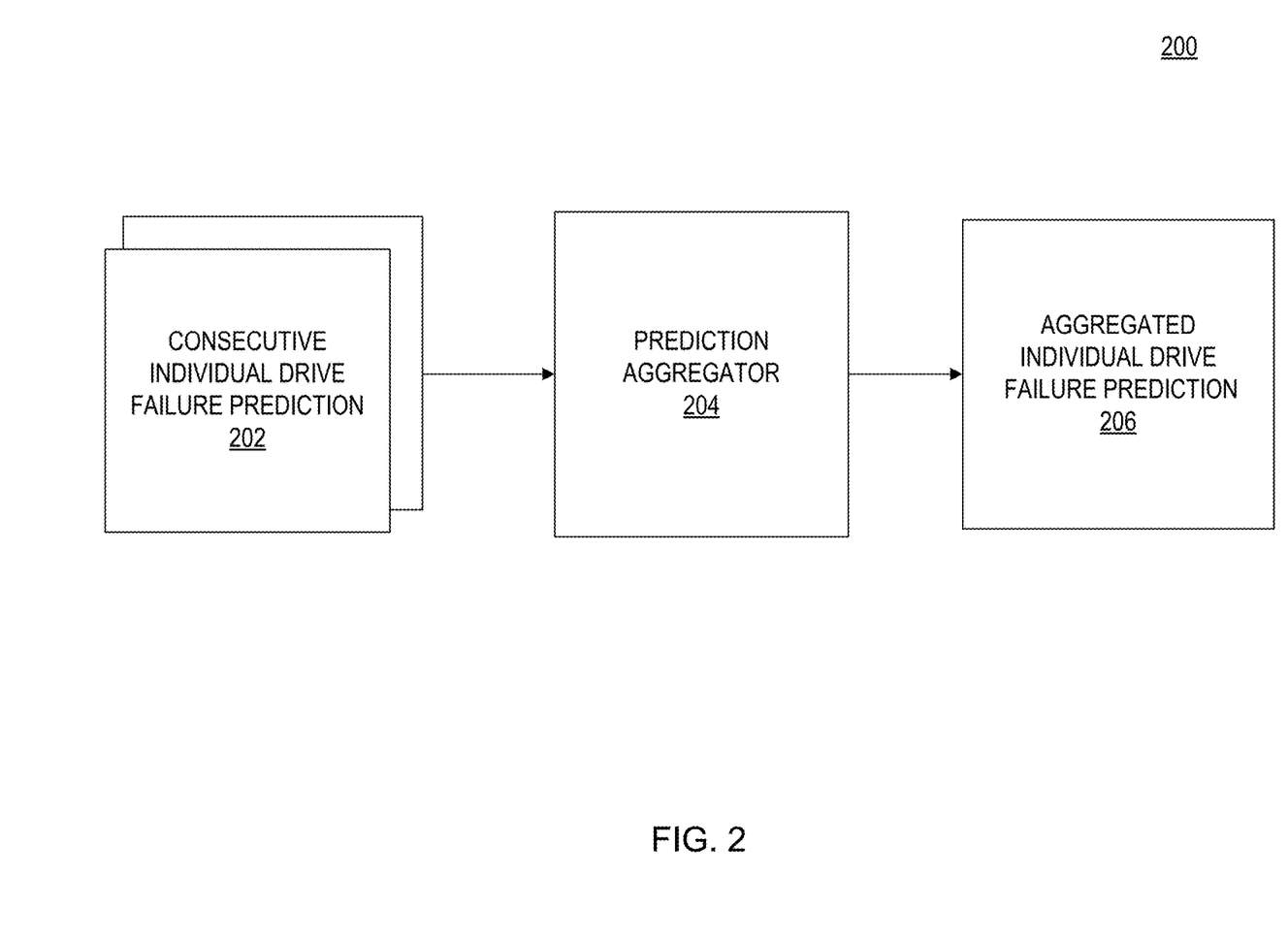
FIG. 2 is a block diagram illustrating an overview of components of a system for predicting drive failures in further detail according to one embodiment of the invention.

FIG. 2 is a block diagram illustrating further details of a system for predicting drive failures 200, in which consecutive time-stamp drive failure predictions 202, i.e. the probability of failure based on the drive features at consecutive time-stamps and drive behavior history features generated by the machine learning model, are aggregated using a prediction aggregator 204 into an aggregated drive failure prediction 206. In one embodiment, the aggregated drive failure prediction 206 incorporates the accumulated drive failure probability into a more accurate individual drive failure prediction 206 than can be determined from a drive failure prediction at a single time-stamp.

Figure 3A:
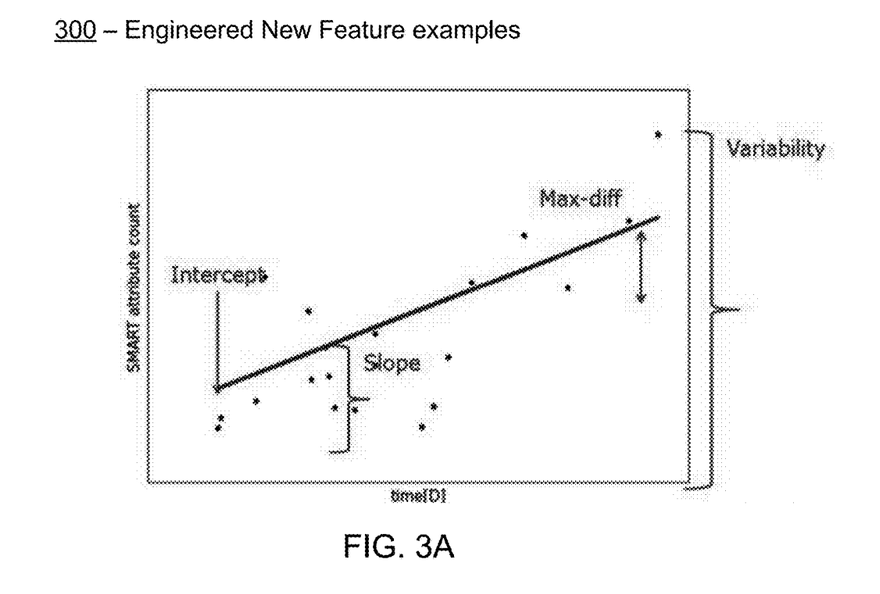
FIGS. 3A-3B is a block diagram illustrating examples of drive behavior features for predicting drive failures in further detail according to one embodiment of the invention.
Figure 3B:
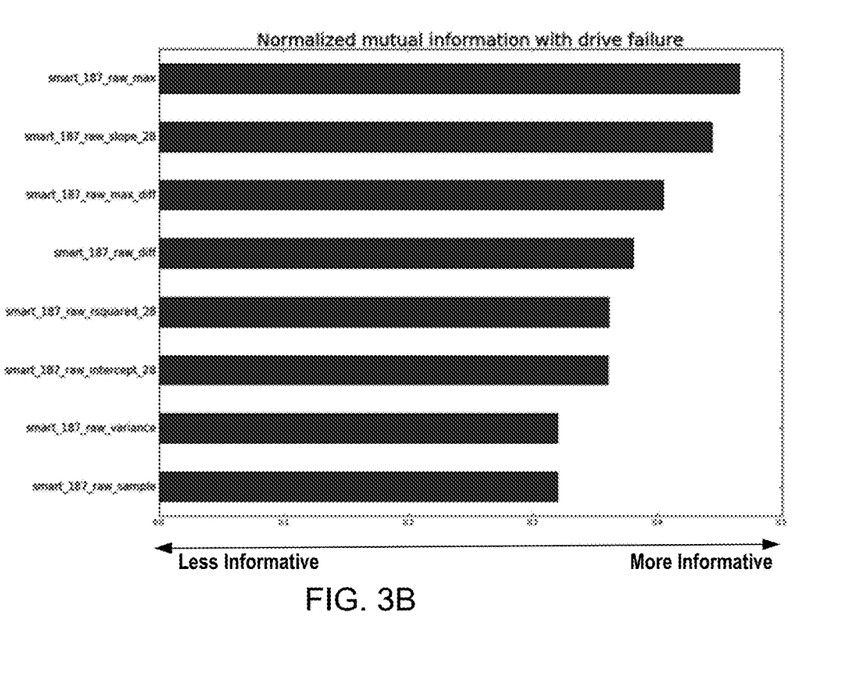

FIGS. 3A-3B illustrate, by way of example only, certain aspects of several drive behavior history features generated in accordance with an embodiment of the invention. The behavior history features, also referred to as the engineered features of a drive, capture different aspects related to the trend and rate of SMART attribute change over time, as well as other statistical features of each SMART attribute sample population.

Examples of features that can be extracted from the temporal 'raw' SMART data attributes, to capture the behavior of the drive in a continuous time window, i.e. the drive behavior history, are shown in FIG. 3A. As illustrated, and by way of example only, in one embodiment, the application of the model to the SMART attribute samples over time calculates the slope and intercept of the line that best describes the behavior history feature trend with time and the variance associated with each SMART attribute at the specified time period "time(D)."

In one embodiment, the size of the specified time period "time(D)" is defined according to the objectives in applying the model. For example, a reasonable choice is to model the drive's behavior during two recent weeks or the last month. Once the new "historical," or "engineered" features are generated, i.e., drive behavior history features, a second application of the model is performed to generate predictions based on those drive behavior history features as well as the features generated based on the original "raw" SMART data attribute values.

A comparison of the informative value of the new "historical," or "engineered" features to the informative value of the drive features generated based on the original "raw" SMART data attribute values is illustrated in FIG. 3B. As shown, and by way of example only, of the nine different features related to a single SMART data attribute #187, only the bottom feature represents a drive feature generated based on the original "raw" SMART data attribute values; the other eight features above the bottom features are all engineered features derived from the original raw SMART data attribute value, and listed sorted in order of mutual information, i.e. how informative they are, normalized to predicting drive failure. As illustrated, the engineered features are more informative, i.e. more predictive of drive failure, than the original drive feature based on the raw SMART data. Thus, the drive behavior history feature is more robust in its ability to predict drive failure than the features generated from the snapshots of raw data alone, such as the data in the last collected sample of SMART data.

Figure 4:
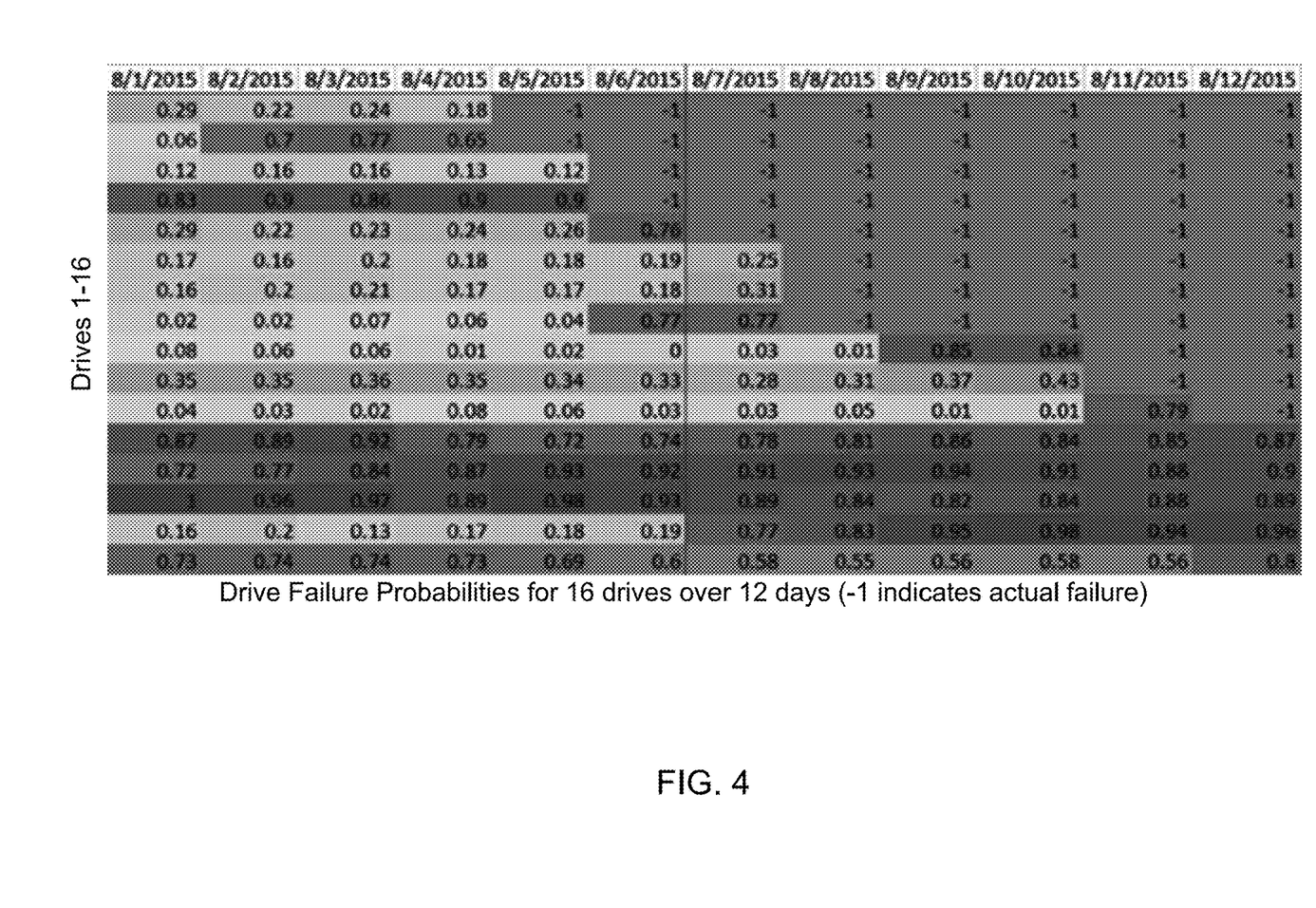
FIG. 4 is a chart illustrating examples of drive failure predictions according to one embodiment of the invention.

In one embodiment, collection of samples of SMART data attributes occur daily, and allow for the use of a "continuous" evaluation approach to modeling. For example, with reference to FIG. 4, and by way of example only, a collection of sample SMART data attributes has been collected over 12 days for 16 individual drives, represented as rows in the table of drive failure probabilities. In one embodiment, consecutive application of the machine learning model to the individual samples of SMART data, and then to the collection of SMART data and the engineered drive behavior history features over time enhances the knowledge of the state of the drive with the most recent data as reflected in the FIG. 4 table. As illustrated, training and applying the model in subsequent days with the new "historical" features during the 12-day period greatly improves the accuracy of the predictions as borne out by the actual failures that occur (the −1 values) in the second half of the 12-day time period. For this group of 16 drives, the precision of predicting the individual drive failures was 83.3 percent, with a prediction mean time of 14 days prior to an actual failure.

Figure 5:
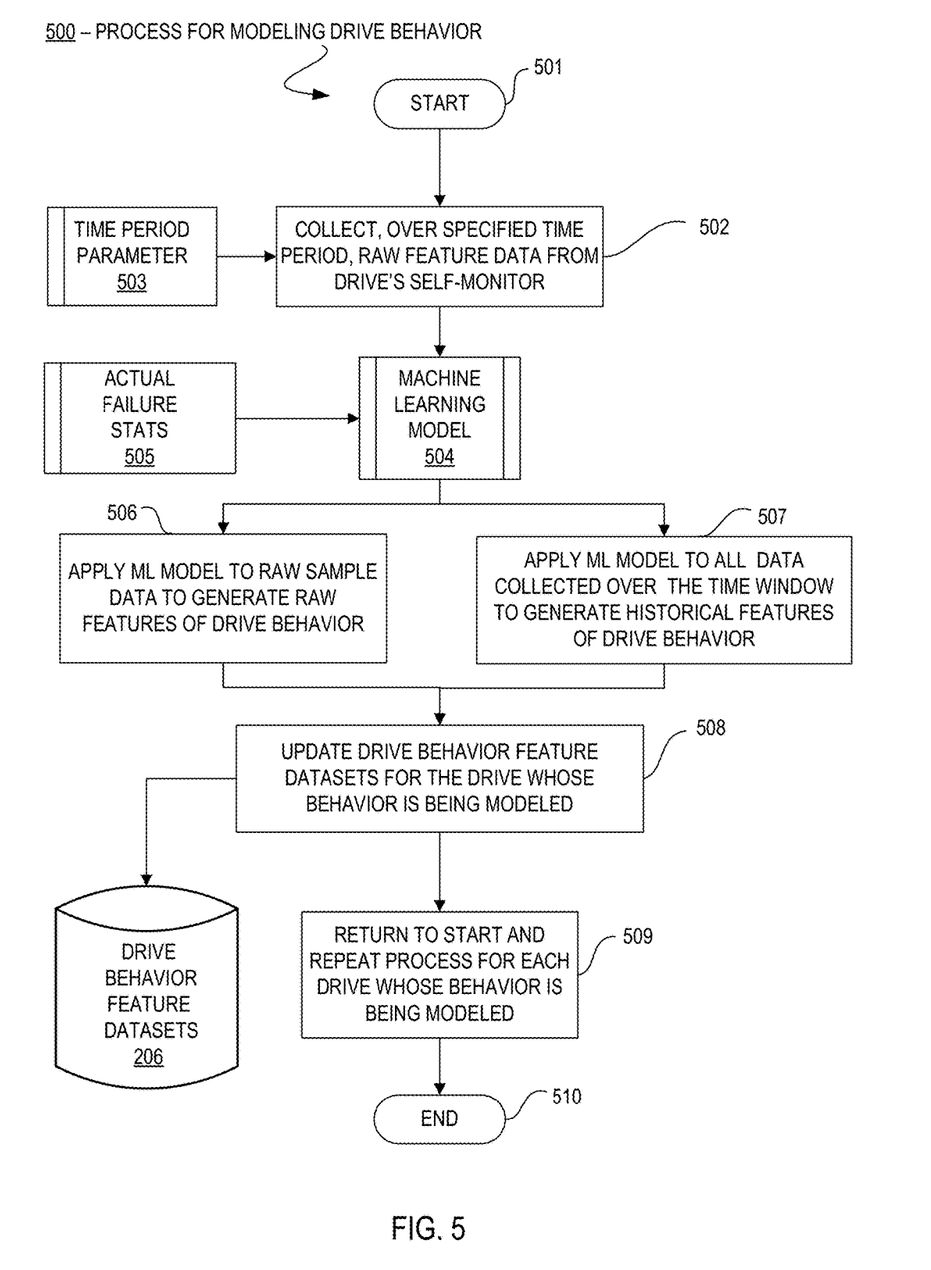
FIGS. 5-7 are flow diagrams illustrating processes for predicting drive failures according to one embodiment of the invention.
Figure 6:
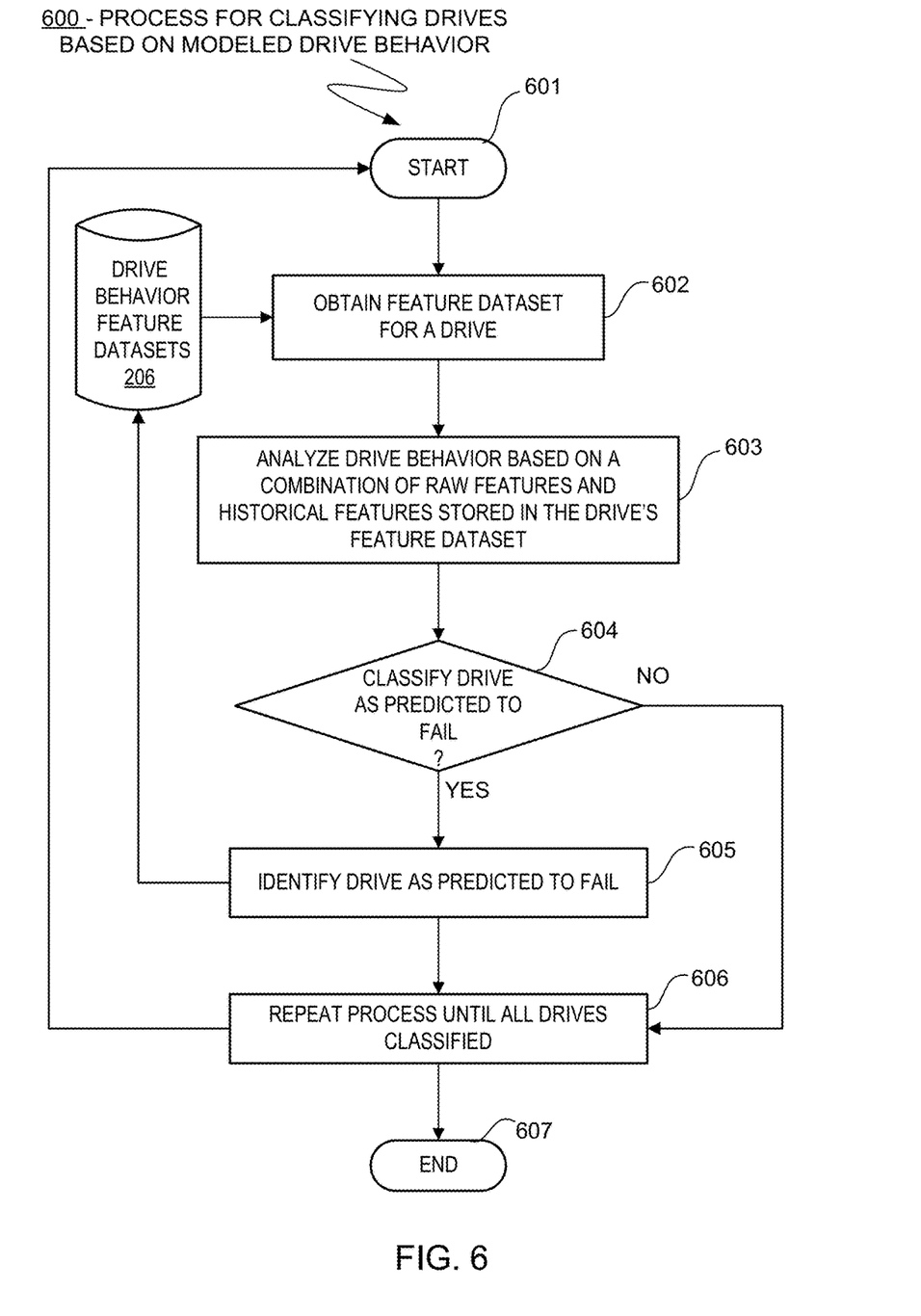
Figure 7:
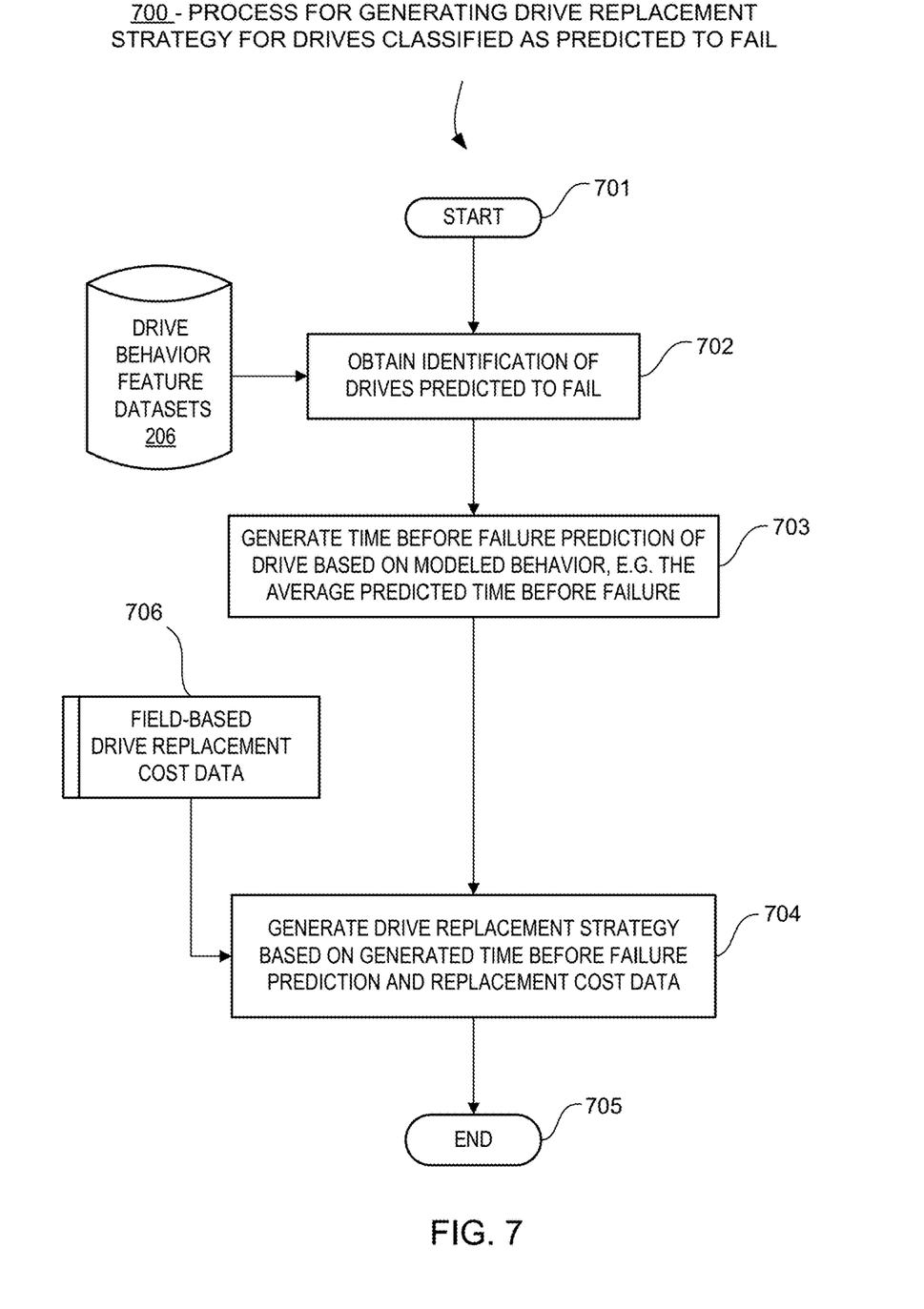

FIGS. 5-7 are flow diagrams illustrating processes 500/600/700 for modeling drive behavior process 500, classifying drives based on modeled drive behavior process 600, and generating a drive replacement strategy for drives classified as predicted to fail process 700. Processes 500/600/700 may be performed by processing logic that includes hardware (e.g. circuitry, dedicated logic, etc.), software (e.g., embodied on a non-transitory computer readable medium), or a combination thereof. For example, the data collector 110, machine learning model 114/116 and classifier 120 components of predicting drive failures as illustrated in FIG. 1 through FIG. 4, can perform processes 500/600/700, all or in part, or in any order and not just the illustrated order.

With reference to the embodiment of processes illustrated in FIG. 5, the process 500 to model drive behavior begins at 502 to collect, over a specified time period, raw feature data originating from a drive's self-monitor, such as the SMART monitor. The time period can vary depending on the objective of applying the model, and can be changed as a time period parameter 503. For the application of the machine learning model 504, taking into account the actual failure statistics 505 to train the machine learning model, the process first applies the feature selection machine learning model at 506 to select the informative raw features of drive behavior based on the SMART data attributes collected in the last sample. In one embodiment, at 507, the process 500 applies the feature engineering machine learning model to all data collected over the specified time window, or time period, to generate the one or more historical features of drive behavior, i.e. the drive behavior history feature(s).

In one embodiment, at 508, the process 500 updates the drive behavior feature datasets for the drive whose behavior is being modeled. At 509, the process 500 is repeated until each drive's behavior has been modeled. In one embodiment, at 508, updating the feature datasets for the drive whose behavior is being modeled, includes storing the features on the drive behavior features data sets repository 206.

With reference to the embodiment of the process 600 illustrated in FIG. 6, once the drive's behavior has been modeled as illustrated in FIG. 5, the process 600 at 602 obtains the feature dataset for the drive from the drive behavior feature datasets repository 206. At 603, process 600 analyzes the drive behavior based on a combination of the raw features and the historical features stored in the drive's features dataset. In one embodiment, at decision block 604, the process 600 classifies the drive as predicted to fail when the individual drive failure probabilities predicted by the model exceed a certain threshold or meet other criteria for classifying failed and healthy drives. In one embodiment, the decision can be based on one or more features in combination with one another, and/or on the aggregated prediction probabilities as described in FIG. 2.

In one embodiment, at 605, for drives predicted to fail, the drive is identified as predicted to fail, such as by flagging the drive by its drive identifier as belonging to the classification of predicted to fail in the drive behavior features data sets repository 206. At 606, the process 600 is repeated until all drives have been classified.

With reference to the embodiment of the process 700 illustrated in FIG. 7, once the drive's behavior has been modeled with the latest collected samples of drive health indicators and the drive classified as predicted to fail as illustrated in FIGS. 5 and 6, additional processing and analysis of the modeling results are performed in a separate process. For example at process 700 at 702 obtains the identification of those drives that are currently predicted to fail. At 703 process 700 optionally generates a prediction that specifies the average predicted time before failure. As with the decision at decision block 604 in FIG. 6, the time before failure prediction can be based on one or more features in combination with one another, or on the aggregated predictions as described in FIG. 2.

In one embodiment, once the prediction is generated, at 704 the process 700 can generate a cost-effective drive replacement strategy based on the prediction and, optionally, based on additional information relating to the field-based drive replacement cost data for the drives whose failure has been predicted.

Figure 8:
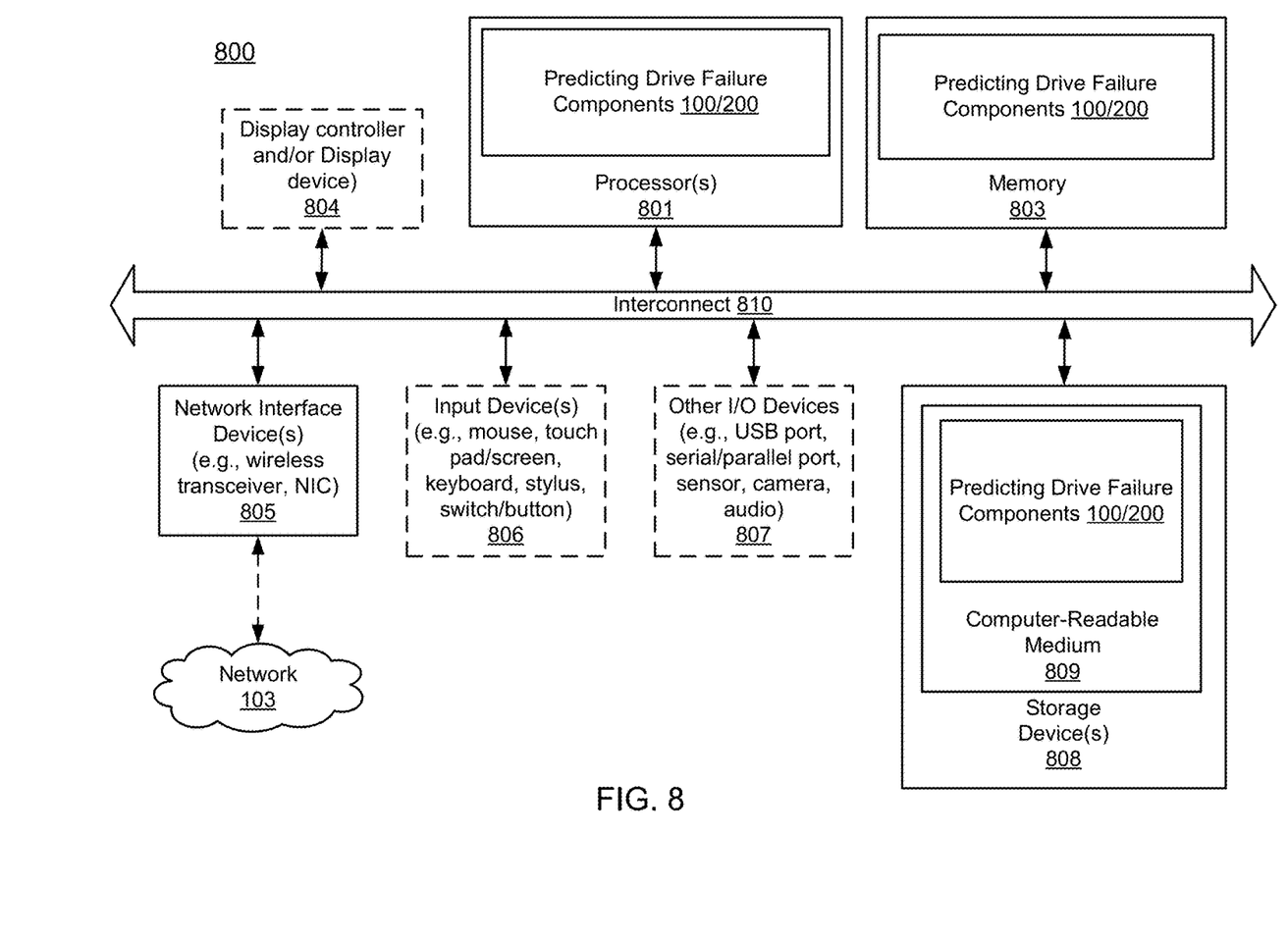
FIG. 8 is a block diagram illustrating a general overview of a data processing system environment for providing a system for predicting drive failures according to one embodiment of the invention.

FIG. 8 is a block diagram illustrating an example of a data processing system 800 that may be used with one embodiment of the invention. For example, system 800 represents any of data processing systems described above performing any of the processes or methods described above. System 800 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 800 is intended to show a high level view of many components of the computer system. However, it is to be understood that additional components may be present in certain implementations and furthermore, different arrangement of the components shown may occur in other implementations. System 800 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 800 includes processor 801, memory 803, and devices 805-808 via a bus or an interconnect 810. Processor 801 may represent a single processor or multiple processors with a single processor core or multiple processor cores included therein. Processor 801 may represent one or more general-purpose processors such as a microprocessor, a central processing unit (CPU), or the like. More particularly, processor 801 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 801 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 801, which may be a low power multi-core processor socket such as an ultra-low voltage processor, may act as a main processing unit and central hub for communication with the various components of the system. Such processor can be implemented as a system on chip (SoC). Processor 801 is configured to execute instructions for performing the operations and steps discussed herein. System 800 may further include a graphics interface that communicates with optional graphics subsystem 804, which may include a display controller, a graphics processor, and/or a display device.

Processor 801 may communicate with memory 803, which in one embodiment can be implemented via multiple memory devices to provide for a given amount of system memory. Memory 803 may include one or more volatile storage (or memory) devices such as random access memory (RAM), dynamic RAM (DRAM), synchronous DRAM (SDRAM), static RAM (SRAM), or other types of storage devices. Memory 803 may store information including sequences of instructions that are executed by processor 801, or any other device. For example, executable code and/or data of a variety of operating systems, device drivers, firmware (e.g., input output basic system or BIOS), and/or applications can be loaded in memory 803 and executed by processor 801. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 800 may further include IO devices such as devices 805-808, including network interface device(s) 805, optional input device(s) 806, and other optional IO device(s) 805. Network interface device 805 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 806 may include a mouse, a touch pad, a touch sensitive screen (which may be integrated with display device 804), a pointer device such as a stylus, and/or a keyboard (e.g., physical keyboard or a virtual keyboard displayed as part of a touch sensitive screen). For example, input device 806 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 807 may include an audio device. An audio device may include a speaker and/or a microphone to facilitate voice-enabled functions, such as voice recognition, voice replication, digital recording, and/or telephony functions. Other IO devices 807 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 807 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 810 via a sensor hub (not shown), while other devices such as a keyboard or thermal sensor may be controlled by an embedded controller (not shown), dependent upon the specific configuration or design of system 800.

To provide for persistent storage of information such as data, applications, one or more operating systems and so forth, a mass storage (not shown) may also couple to processor 801. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 801, e.g., via a serial peripheral interface (SPI). This flash device may provide for non-volatile storage of system software, including a basic input/output software (BIOS) as well as other firmware of the system.

Storage device 808 may include computer-accessible storage medium 809 (also known as a machine-readable storage medium or a computer-readable medium) on which is stored one or more sets of instructions or software (e.g., module, unit, and/or logic of any of the components of predicting drive failure components 100/200) embodying any one or more of the methodologies or functions described herein. Components 100/200 may also reside, completely or at least partially, within memory 803 and/or within processor 801 during execution thereof by data processing system 800, memory 803 and processor 801 also constituting machine-accessible storage media. Components 100/200 may further be transmitted or received over a network via network interface device 805.

Computer-readable storage medium 809 may also be used to store the some software functionalities described above persistently. While computer-readable storage medium 809 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Components of predicting drive failures 100/200 and other features described herein can be implemented as discrete hardware components or integrated in the functionality of hardware components such as ASICS, FPGAs, DSPs or similar devices. In addition, components 100/200 can be implemented as firmware or functional circuitry within hardware devices. Further, components 100/200 can be implemented in any combination hardware devices and software components.

Note that while system 800 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems that have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for predicting drive failures, the method comprising:
    collecting any one or more samples of drive health indicators from a drive over a specified time period, wherein the samples of drive health indicators include one or more Self-Monitoring, Analysis and Reporting Technology (SMART) attributes obtained from the drive;
    performing a first feature selection modeling of a last collected sample of SMART drive health indicators to generate a drive feature for the drive, the drive feature for modeling a drive health at a time of the last collected sample;
    performing a second feature engineering modeling of collected samples of SMART drive health indicators over the specified time period to generate one or more drive behavior history features for the drive, the drive behavior history features for modeling the drive health over the specified time period; and
    classifying the drive as more likely to experience failure than other drives, the classifying based on predicted drive failure probabilities representing the drive health, including:

the drive health at the time of the last collected sample as modeled by the drive feature, and the drive health over the specified time period as modeled by the drive behavior history features.

2. The computer-implemented method of claim 1, wherein the first and second modeling are performed using a machine learning model.

3. The computer-implemented method of claim 1, wherein the drive health indicators are any one or more of attributes specified in the Self-Monitoring, Analysis and Reporting Technology (SMART) industrial standard for disk drives.

4. The computer-implemented method of claim 1, wherein the drive behavior history features for the drive are derived from any function describing values of drive health indicators over the specified time period as obtained from the collected samples.

5. The computer-implemented method of claim 1, further comprising:

performing consecutive modeling of last collected samples and collected samples over the specified time period;

aggregating the predicted drive failure probabilities resulting from the consecutive modeling; and classifying the drive as more likely to experience failure than other drives, the classifying based on the drive health over the time period spanned by the consecutive modeling as modeled by the aggregated predicted drive failure probabilities.

6. The computer-implemented method of claim 1, further comprising:

obtaining replacement cost data for the drive; and generating a drive replacement strategy for the drive classified as more likely to experience failure based on the replacement cost data.

7. A data processing system comprising:

a distributed file system in which to store drive behavior datasets containing features modeling drive health of a plurality of drives operating in a storage system;

a processor in communication with the distributed file system and the plurality of drives operating in the storage system, the processor configured to:

collect any one or more samples of drive health indicators from a drive over a specified time period, wherein the samples of drive health indicators include one or more Self-Monitoring, Analysis and Reporting Technology (SMART) attributes obtained from the drive;

perform a first feature selection modeling of a last collected sample of SMART drive health indicators to generate a drive feature for the drive, the drive feature modeling a drive health at a time of the last collected sample;

perform a second feature engineering modeling of collected samples of SMART drive health indicators over the specified time period to generate one or more drive behavior history features for the drive, the drive behavior history features modeling the drive health over the specified time period; and classify the drive as more likely to experience failure than other drives, the classifying based on predicted drive failure probabilities representing the drive health, including:

the drive health at the time of the last collected sample as modeled by the drive feature, and the drive health over the specified time period as modeled by the drive behavior history features.

8. The data processing system of claim 7, wherein the first and second modeling are performed using a machine learning model.

9. The data processing system of claim 7, wherein the drive health indicators are any one or more of attributes specified in the Self-Monitoring, Analysis and Reporting Technology (SMART) industrial standard for disk drives.

10. The data processing system of claim 7, wherein the drive behavior history features for the drive are derived from any function describing values of drive health indicators over the specified time period as obtained from the collected samples.

11. The data processing system of claim 7, further comprising:

performing consecutive modeling of last collected samples and collected samples over the specified time period; and aggregating the predicted drive failure probabilities resulting from the consecutive modeling; and classifying the drive as more likely to experience failure than other drives, the classifying based on the drive health over the time period spanned by the consecutive modeling as modeled by the aggregated predicted drive failure probabilities.

12. The data processing system of claim 7, further comprising:

obtaining replacement cost data for the drive; and generating a drive replacement strategy for the drive classified as more likely to experience failure based on the replacement cost data.

13. A non-transitory computer-readable storage medium having instructions stored therein, which when executed by a processor, cause the processor to perform operations for predicting drive failures, the operations comprising:

collect any one or more samples of drive health indicators from a drive over a specified time period, wherein the samples of drive health indicators include one or more Self-Monitoring, Analysis and Reporting Technology (SMART) attributes obtained from the drive;

perform a first feature selection modeling of a last collected sample of SMART drive health indicators to generate a drive feature for the drive, the drive feature modeling a drive health at a time of the last collected sample;

perform a second feature engineering modeling of collected samples of SMART drive health indicators over the specified time period to generate one or more drive behavior history features for the drive, the drive behavior history features modeling the drive health over the specified time period; and classify the drive as more likely to experience failure than other drives, the classifying based on predicted drive failure probabilities representing the drive health, including:

the drive health at the time of the last collected sample as modeled by the drive feature, and the drive health over the specified time period as modeled by the drive behavior history features.

14. The non-transitory computer-readable storage medium of claim 13, wherein the first and second modeling are performed using a machine learning model.

15. The non-transitory computer-readable storage medium of claim 13, wherein the drive health indicators are any one or more of attributes specified in the Self-Monitoring, Analysis and Reporting Technology (SMART) industrial standard for disk drives.

16. The non-transitory computer-readable storage medium of claim 13, wherein the drive behavior history features for the drive are derived from any function describing values of drive health indicators over the specified time period as obtained from the collected samples.

17. The non-transitory computer-readable storage medium of claim 13, the operations further comprising:
- perform consecutive modeling of last collected samples and collected samples over the specified time period;
- aggregate the predicted drive failure probabilities resulting from the consecutive modeling; and
- classify the drive as more likely to experience failure than other drives, the classifying based on the drive health over the time period spanned by the consecutive modeling as modeled by the aggregated predicted drive failure probabilities.

18. The non-transitory computer-readable storage medium of claim 13, the operations further comprising:
- obtain replacement cost data for the drive; and
- generate a drive replacement strategy for the drive classified as more likely to experience failure based on the replacement cost data.

* * * * *